(12) United States Patent
Thaw et al.

(10) Patent No.: US 10,814,208 B2
(45) Date of Patent: Oct. 27, 2020

(54) METHOD FOR DELIVERING SPORTS TELEMETRY FOR A CURLING GAME

(71) Applicants: Howard Thaw, Ottawa (CA); Chun Mei Gao, Ottawa (CA); Ian Kennneth MacAulay, Ottawa (CA); Minh Anh Nguyen, Limoges (CA)

(72) Inventors: Howard Thaw, Ottawa (CA); Chun Mei Gao, Ottawa (CA); Ian Kennneth MacAulay, Ottawa (CA); Minh Anh Nguyen, Limoges (CA)

( * ) Notice: Subject to any disclaimer, the term of this patent is extended or adjusted under 35 U.S.C. 154(b) by 0 days.

(21) Appl. No.: 16/380,471

(22) Filed: Apr. 10, 2019

(65) Prior Publication Data

US 2019/0321710 A1    Oct. 24, 2019

Related U.S. Application Data

(60) Provisional application No. 62/661,447, filed on Apr. 23, 2018.

(51) Int. Cl.
*A63B 71/06* (2006.01)
*A63B 67/14* (2006.01)
*A63B 24/00* (2006.01)
*H04B 1/38* (2015.01)

(52) U.S. Cl.
CPC ...... *A63B 71/0622* (2013.01); *A63B 24/0021* (2013.01); *A63B 67/148* (2013.01); *A63B 71/0605* (2013.01); *A63B 2024/0028* (2013.01); *A63B 2071/0647* (2013.01); *A63B 2220/56* (2013.01); *A63B 2220/62* (2013.01);
(Continued)

(58) Field of Classification Search
USPC ........................................... 700/91
See application file for complete search history.

(56) References Cited

U.S. PATENT DOCUMENTS

| | | | |
|---|---|---|---|
| 2010/0283630 A1* | 11/2010 | Alonso | H04Q 9/00 340/870.11 |
| 2013/0066448 A1* | 3/2013 | Alonso | H04Q 9/00 700/91 |
| 2018/0189971 A1* | 7/2018 | Hildreth | H04N 21/4781 |

(Continued)

FOREIGN PATENT DOCUMENTS

| | | |
|---|---|---|
| CA | 2363877 | 5/2003 |
| CA | 3006829 | 11/2018 |

*Primary Examiner* — Pierre E Elisca

(57) ABSTRACT

A method for delivering sports telemetry for a curling game provides players, coaches, and viewers with the detailed dynamics of a curling stone. The method is generalized to at least one computerized sports equipment in communication with at least one remote server. A sensing module of the sports equipment captures and sends an angular-motion measurement and a linear-motion measurement to the remote server. Further, a tracking module of the sports equipment sends a precise location reading to the remote server. The angular-motion measurement, the linear-motion measurement, and the precise location reading are compiled into a sports telemetry data. Subsequently, the sports telemetry data assess a plurality of summarization metrics which promotes game awareness and interest. Further, the sports telemetry data also generates at least one equipment motion animation of play-by-play breakdown of the game. Finally, an online view platform allows the general public to access the sports telemetry data.

15 Claims, 17 Drawing Sheets

(52) U.S. Cl.
CPC ... *A63B 2220/805* (2013.01); *A63B 2220/833* (2013.01); *A63B 2225/52* (2013.01); *H04B 1/38* (2013.01)

(56) References Cited

U.S. PATENT DOCUMENTS

2019/0180468 A1\* 6/2019 Hildreth ............. H04N 21/4524
2019/0321683 A1\* 10/2019 Yerli ................... H04N 21/2187
2020/0070002 A1\* 3/2020 Hall ..................... A61B 5/0022

\* cited by examiner

METHOD FOR DELIVERING SPORTS TELEMETRY FOR A CURLING GAME

The current application claims a priority to the U.S. Provisional Patent application Ser. No. 62/661,447 filed on Apr. 23, 2018.

FIELD OF THE INVENTION

The present invention generally relates to a method for delivering sports telemetry for a curling game. More specifically, the method provides players, coaches, and viewers with in-depth game analysis and sports telemetry for increased game awareness and interest.

BACKGROUND OF THE INVENTION

As with any sport, success in curling requires directed practice to develop specific skills. A major skill in curling is the ability to release the curling stone on the sheet of ice so that the subsequent path of the curling stone curves or "curls" near the end of the curling sheet. The curl allows the curling stone to move in a direction that maximizes the chances for a "curling shot". The curl, created by the player and ice friction, derives from curling stone rotation.

In particular, the component of angular velocity vector parallel to the trajectory of the curling stone, known as "rotation" contributes greatly to the sideways friction force. The ability to consistently generate large and controllable side rotation is a hallmark of an expert curler. All other factors that influence the friction on the curling stone also influence the curl including the pattern of scratch from curler sweeping, the ice condition, temperature and humidity.

Clearly, the dynamics of a curling stone down the lane is determined by the instantaneous velocity and angular velocity of the curling stone when it is released from the curler's hand (as well as all other factors influencing curling stone friction). Knowing these, "initial" or "release" conditions is vital to understanding both player skill and curling stone design. Fortunately, precise measurements of these (and many other) characteristics of curling stone motion are now possible through the advent of microelectromechanical system (MEMS) inertial sensors.

MEMS inertial sensors include tri-axis accelerometers which detect the acceleration of a point and single, dual and now tri-axis angular rate gyros which detect the components of the angular velocity of the body to which they are attached. The magnetometer (magnetic field and compass) is used to calculate the number rotation, angle of release and the back and hog line. A magnetic strip is installed in the back and hog line to trigger a magnetic field so the MEMS sensor can detect each line.

When combined to form a complete strap-down inertial measurement unit (IMU), these inertial sensors detect the six degrees of freedom of a rigid body in space by sensing the acceleration (vector) of one point on the body as well as the angular velocity (vector) of the body. When mounted on or within sports equipment, a miniature IMU provides the essential data needed to resolve the motion of that equipment as disclosed by MEMS-based sports training systems have been developed for golf and for fly fishing, among additional applications currently underway.

MEMS-based sensors for curling stones currently on the market employ a commercial wireless IMU mounted to the curler's forearm to measure forearm motion. Unfortunately, strapping the sensor to the curler's forearm renders this approach invasive (and potentially uncomfortable) and it also eliminates the ability to measure the actual dynamics of the curling stone due to significant dynamics contributed by the (unmonitored) wrist and finger joints.

The present invention utilizes a wireless network (Wifi and Bluetooth) IMU, UWB, that can be readily embedded within an actual curling stone.

Therefore, this yields a more direct measure of the dynamics of the curling stone during both the delivery phase and its subsequent motion down the sheet. High quality sports telemetry and game analysis are provided by carefully examining the angular velocity, linear velocity, tracking location, and orientation of the curling stone for example shots made by professional curlers.

The sports telemetry enables an analysis of the friction force acting on a curling stone and distills this analysis to a measurable "hook potential" metric for further assessing curler skill.

DETAILED DESCRIPTION OF THE INVENTION

All illustrations of the drawings are for the purpose of describing selected versions of the present invention and are not intended to limit the scope of the present invention.

The present invention is a method and system to providing sports telemetry data for a curling game. More specifically, the present invention enables players, coaches, and viewers gain valuable insights into the dynamics of the curling game by carefully tracking the angular velocity, linear velocity, tracking location, and orientation of a curling stone.

Figure 1:
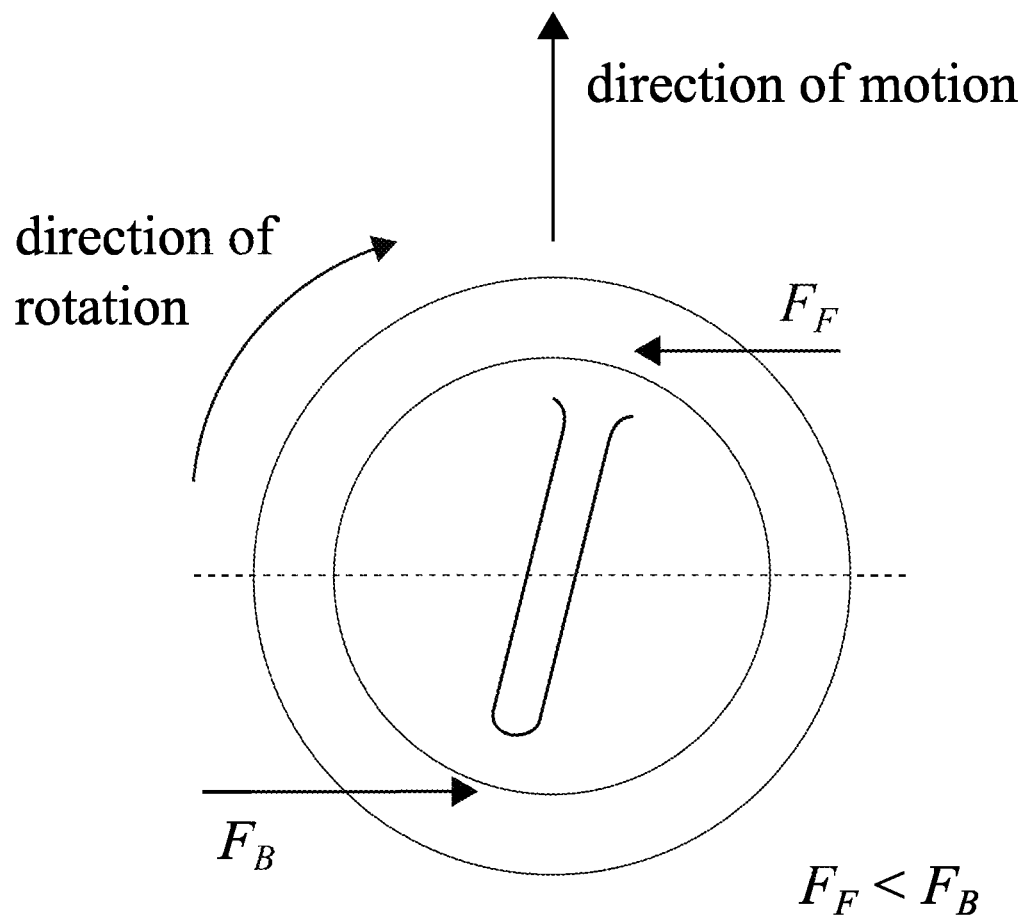
FIG. 1 illustrates the forces acting on a curling stone while traveling across a curling sheet.
Figure 2:
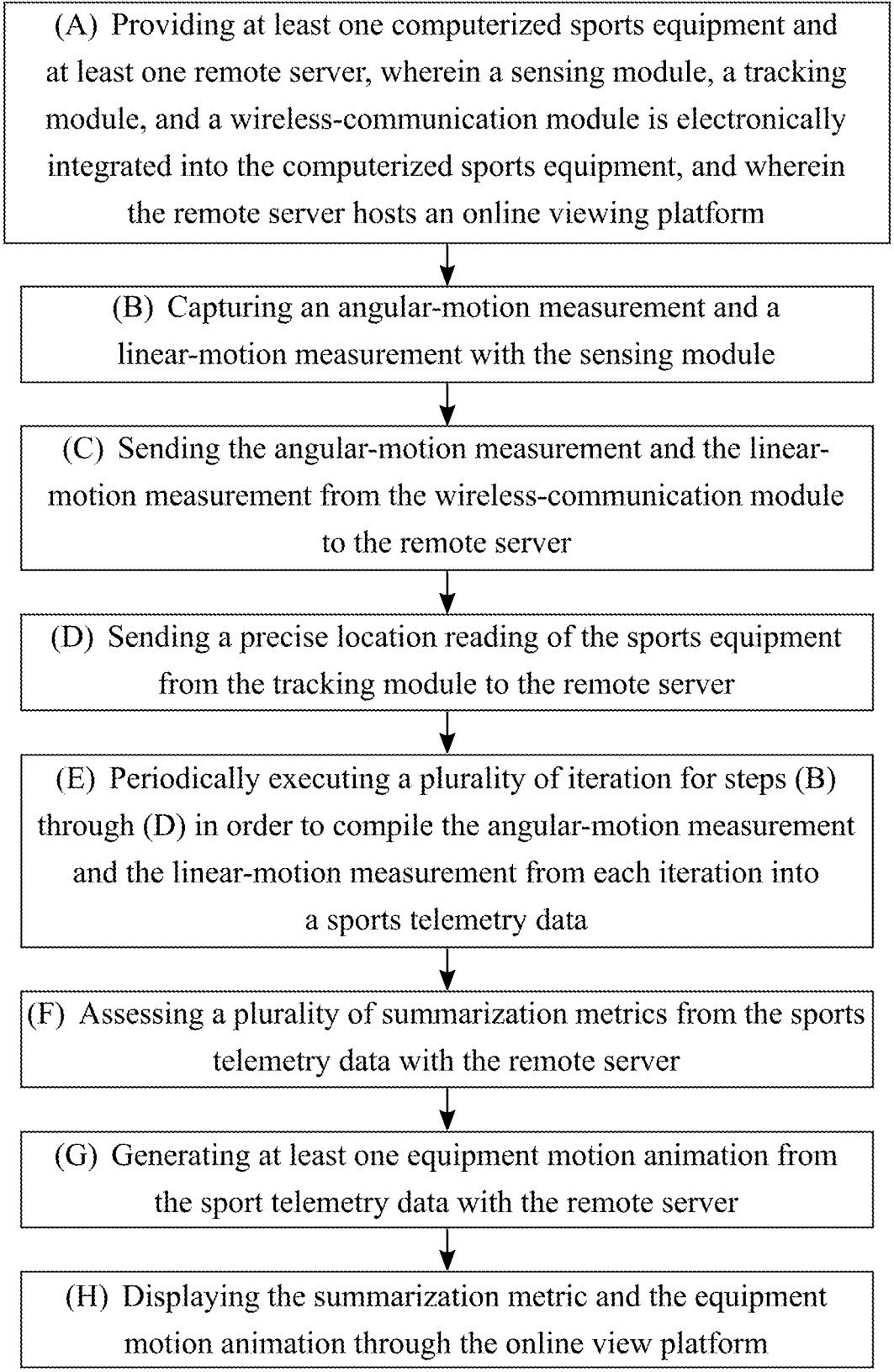
FIG. 2 is a flowchart of the overall process for the method of the present invention.

FIG. 2 illustrates the general process of the present invention, wherein a linear and rotational motion of a sports equipment are transmitted to a host computer for storage, distribution, and analysis. The preferred embodiment of the present invention is provided at least one computerized sports equipment and at least one remote server, wherein a sensing module, a tracking device, and a wireless-communication module are electronically integrated into the computerized sports equipment, and wherein the remote server hosts an online viewing platform (Step A). In the preferred embodiment, the sports equipment is the curling stone used for the curling game. Likewise, the preferred sensing module is a micro-electro-mechanical systems (MEMS) sensor embedded into the handle of the curling stone for tracking the precise location of the curling stone. Accordingly, the sensing module captures an angular-motion measurement and a linear-motion measurement (Step B). As can be seen in FIG. 1, in the preferred embodiment, the angular-motion measurement is used to measure the rotation of the curling stone. Generally, if a player rotates the curling stone clockwise when released, the curling stone curls to the right. In contrast, a counter-clockwise rotation causes the curling stone to curl left. The curling stone is heavy, almost 20 kg, and the rotation is very slow, typically 2-3 rotations during the roughly 25 seconds it takes to slide to the target. This is much too slow to cause the curved path taken by the ball in sports such as table tennis, tennis or soccer.

In possible embodiments of the present invention, the sports equipment may include the curling brooms and the clothing of the players themselves. In each of these cases, sensing modules are provided to measure the angular and linear motion of the curling broom and the players' clothing. In another possible embodiment of the present invention, the computerized sports equipment may be a playing article used in a game of basketball, baseball, crew, cricket, golf, fly fishing, soccer, softball, tennis, rowing, and the like.

Communication between the remote server and the sports equipment is enabled by the tracking device and the wireless-communication module. The preferred wireless-communication module transmits data collected from the sensing module to the remote server. The wireless-communication module may utilize dedicated short-range communication protocols or a wireless local area network (WLAN) connection to transmit data to the remote server. Subsequently, the wireless-communication module sends the angular-motion measurement and the linear-motion measurement to the remote server (Step C). In addition to the angular-motion measurement and the linear-motion measurement, the tracking device is used to track the precise location of the sports equipment. As such, the tracking module sends a precise location reading of the sports equipment to the remote server (Step D). The angular-motion measurement, the linear-motion measurement, and the precise location reading can be used to gain valuable insights into the physics of the sports equipment. Further, this can also help players improve their game.

The present invention allows for continual tracking of the game as it is being played. As such, in one possible embodiment, the sports equipment may continuously broadcast the location and motion. The remote server interprets and may interrupt the broadcast depending on the stage of the game. In the preferred embodiment, the sports equipment may be prompted to stop the broadcast by the remote server as required. For example, the tracking module and the sensing module may need to be updated, repaired, or maintained. Additionally, the sport equipment may need to be moved or replaced as required over the course of the game. Accordingly, a plurality of iteration for steps (B) through (D) is periodically executed in order to compile the angular-motion measurement, the linear-motion measurement, and the precise location reading from each iteration into a sports telemetry data (Step E).

More specifically, the remote server compiles the sports telemetry data to be broadcasted to various terminals for viewing by players, coaches, and general public. In the preferred embodiment, the sports telemetry data provides play-by-play analysis of the game. As such, the remote server assesses a plurality of summarization metrics from the sports telemetry data (Step F). This helps players, coaches, and the general public gain a greater level of awareness of what is happening in the game. In the same vein, the remote server also generates at least one equipment motion animation from the sport telemetry data (Step G). The equipment motion animation provides dynamic and realistic play-by-play recreation that keeps viewers completely focused on the game. The equipment motion animation also allows viewers to watch the progress of the game and keeps viewers interested through accurate data reflected in friendly design animations. Finally, the summarization metric and the equipment motion animation is displayed on the online view platform (Step H). The preferred online view platform is hosted on the remote server and can be customized to display specific sports telemetry data or the equipment motion animation. The online view platform is also adaptable to fit be displayed on any type of devices such as smartphone, laptops, tablets, and the like. In addition to displaying the sports telemetry data, the remote server provides sport application programming interface (API), so third-party clients, such as television broadcasters, can build their very own widgets.

In the preferred embodiment, the sensing module is a wireless MEMS inertial measurement unit (IMU). The IMU comprises a tri-axis angular rate gyroscope for measuring the angular-motion measurement and a tri-axis accelerometer for measuring linear-motion measurement. More specifically, the angular-motion measurement includes the angular acceleration and velocity. Similarly, the linear-motion measurement includes the linear acceleration and velocity. Accordingly, the tri-axis accelerometer and the tri-axis gyroscope combine to form a complete strap-down IMU for detecting the six degrees of freedom of a rigid body in space by sensing the acceleration (vector) of one point on the body as well as the angular velocity (vector) of the body. When mounted on or within sports equipment, the IMU provides the essential data needed to resolve the motion of that sports equipment.

In addition to the IMU, the present invention also employs the tracking module to provide precise spatial coordinates of the sports equipment in motion. The preferred tracking module is an ultra-wideband (UWB) tracking transceiver. The UWB transceiver is low-power transceiver that uses a proprietary radio frequency (RF) protocol to transmit tracking location over a typical open-air range of 15-60 feet (4.57-18.29 m) with 60 feet (18.29 m) being achieved in very low ambient RF environments. In contrast, the wireless-communication module is a commercial 2.45 GHz RF transceiver (Wifi) that has a packet latency of 1 millisecond (ms) which allows data collection on a host (laptop) computer via custom data collection software. In both cases, the wireless-communication module and the tracking modules communicate using Transmission Control Protocol/User Datagram Protocol (TCP/UDP) network protocol with the remote server. In possible embodiments of the present invention, the sports telemetry data is stored into a local database or a cloud database for retrieval once the game is completed.

Figure 3:
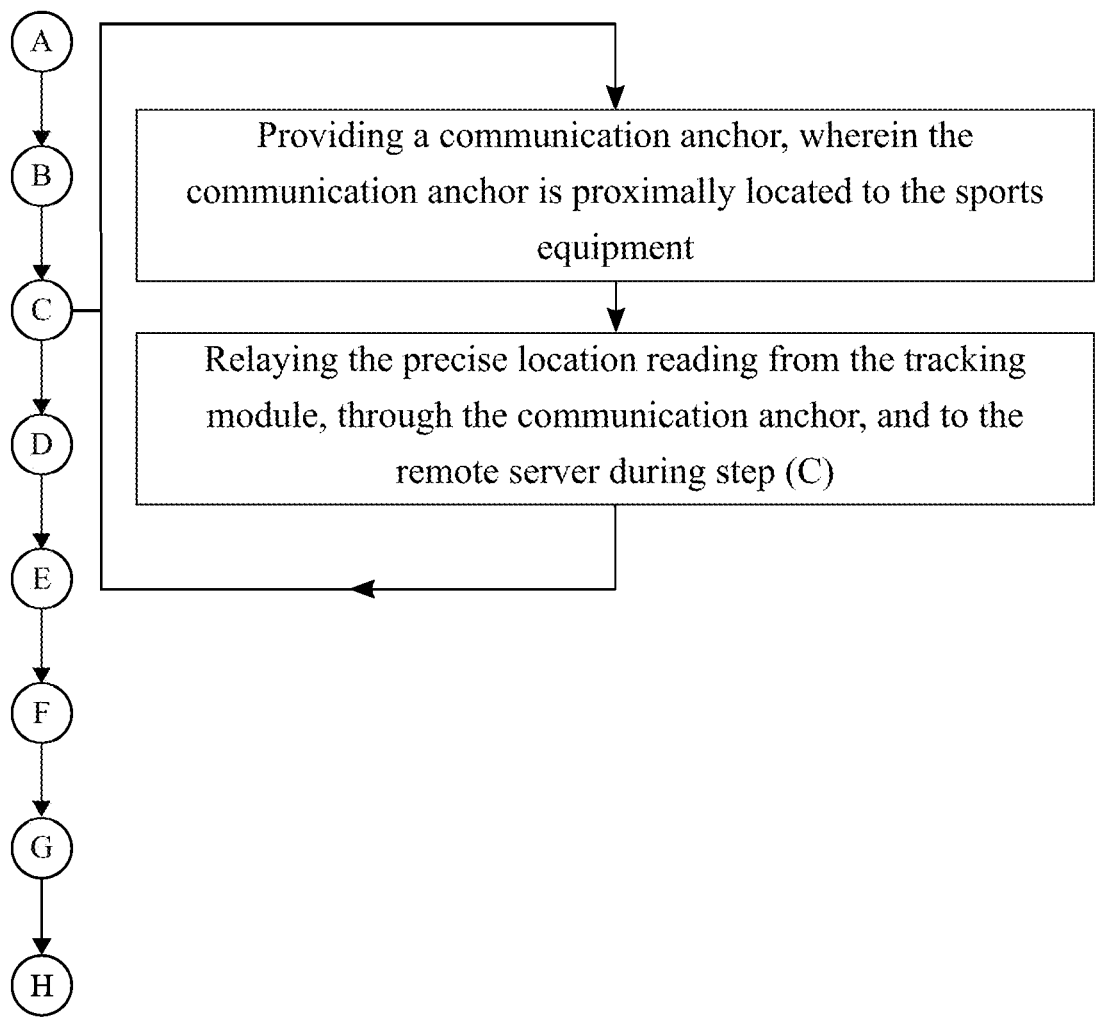
FIG. 3 is a flowchart of a subprocess for relaying a precise location reading from the tracking module to the remote server.

Given that the tracking module uses a short-range RF protocol, a communication anchor must be provided to relay the signals to the remote server. As can be seen in FIG. 3, the communication anchor is provided, wherein the communication anchor is proximally located to the sports equipment. Subsequently, the precise location reading is relayed from the tracking module, through the communication anchor, and to the remote server during step C.

Figure 4:
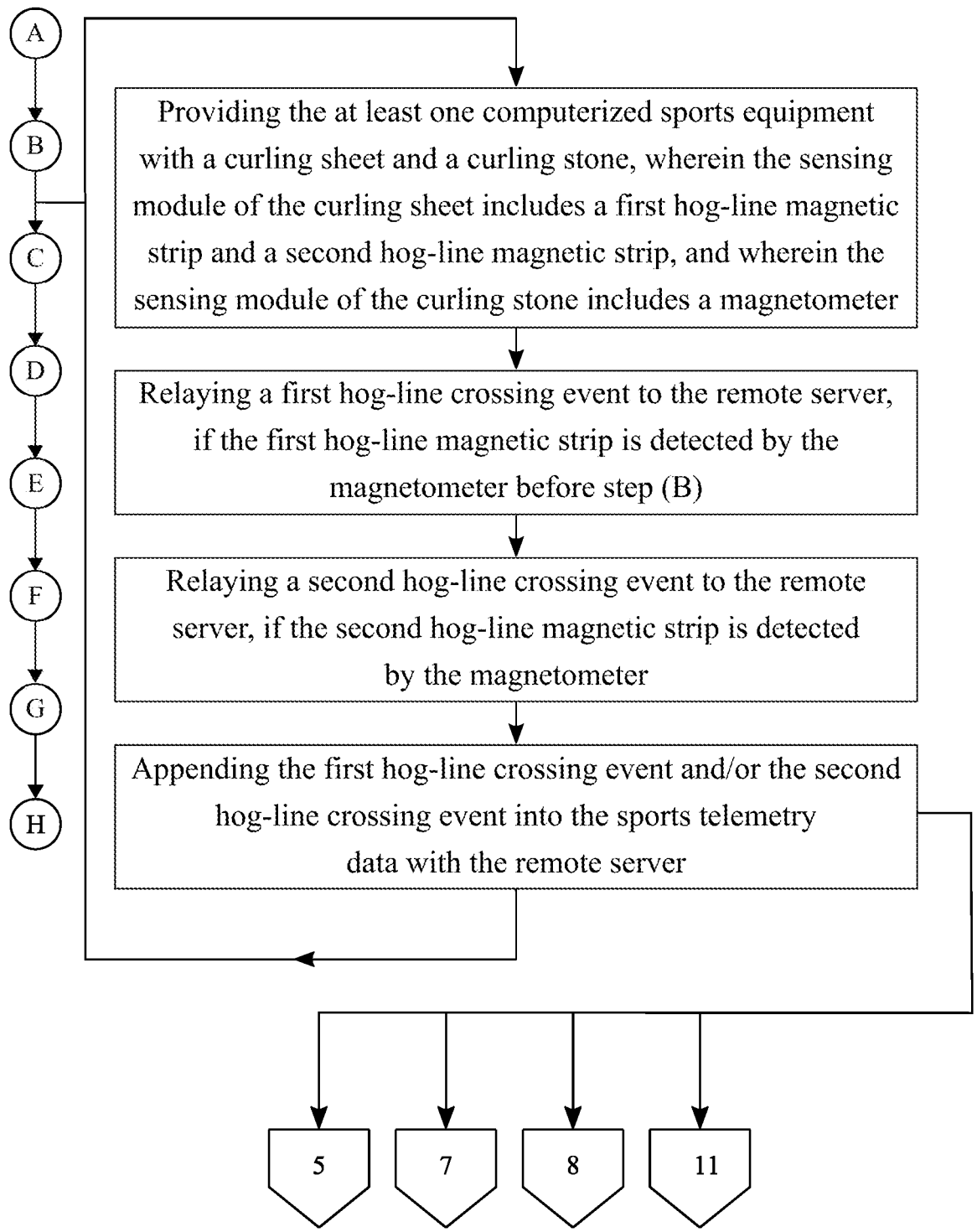
FIG. 4 is a flowchart of a subprocess for detecting the first hog-line magnetic strip and the second hog-line magnetic strip.

FIG. 4 illustrates the preferred implementation of the present invention, wherein the present invention is designed to provide sports telemetry for the curling game. As such, the at least one computerized sports equipment is provided with at least one curling sheet and at least one curling stone, wherein the sensing module of the curling field includes a first hog-line magnetic strip and a second hog-line magnetic strip, and wherein the sensing module of the curling stone includes a magnetometer. In another embodiment, the sports equipment may include a curling broom used by the players. In this embodiment, the sensing module is integrated into the broom shaft and the broom head. Further, the sensing module, the tracking module, and the wireless communication module may be used in conjunction with biometric sensors worn by the players to create a more complete picture of the forces being exerted by the players and the curling brooms on the curling stone. Further, in another possible embodiment, a plurality of curling stones and a plurality of curling sheets may be provided. This allows the present invention to track all of the curling stones and curling sheets used in a curling tournament. Generally, a game of curling utilizes 6 lanes of curling sheets. Each lane accommodates 16 curling stones and 8 players, to give a total of 96 curling stones and 48 curling brooms in total. Preferably, each of the plurality of curling stones is in wireless communication with the remote server. The remote server can simultaneously track the motion of the plurality of curling stones as well as provide highly detailed dynamics of the curling game. Further, the remote server is able to track the hog-to-hog time, sheet time, split time, and hog-line violation of each of the curling stones.

Figure 6:
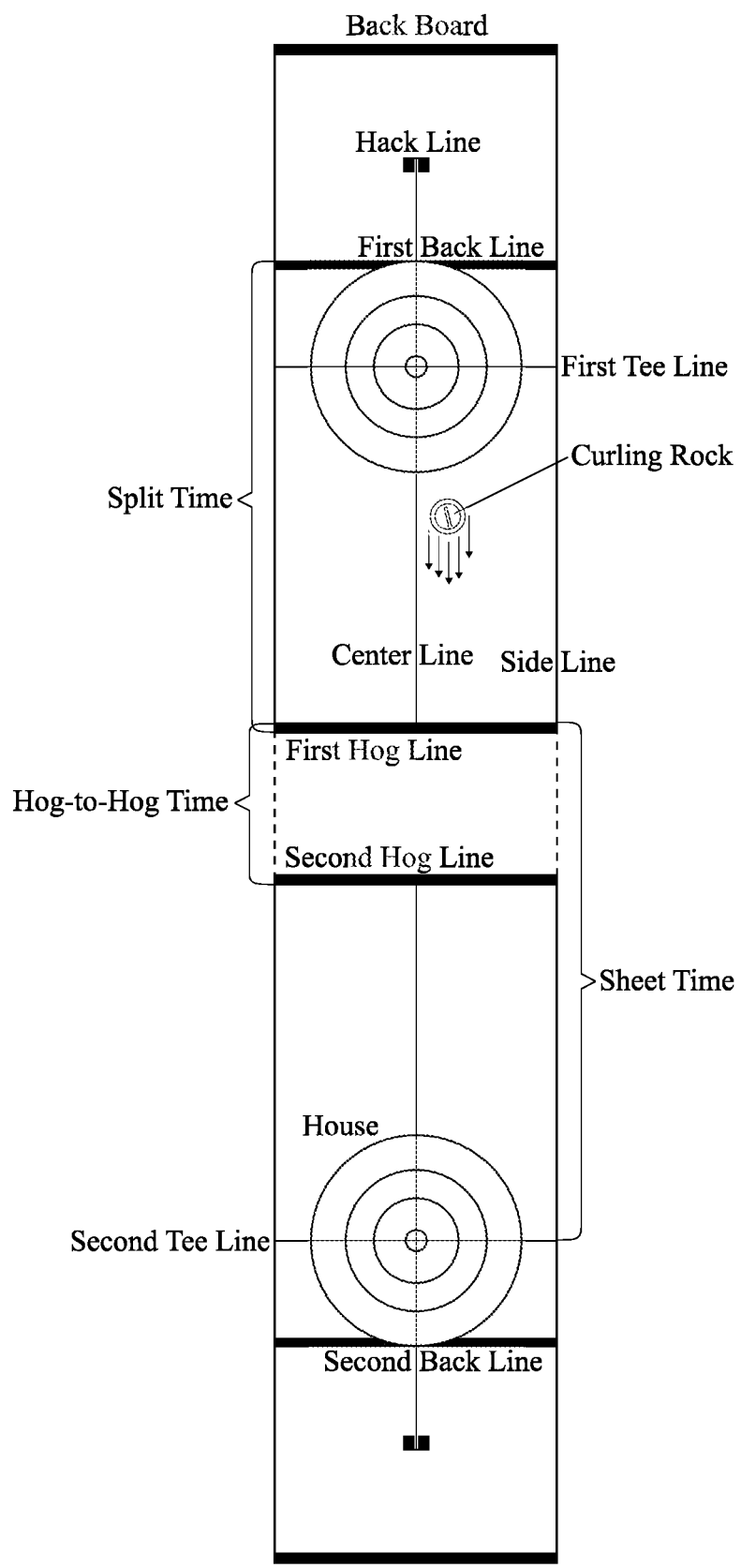
FIG. 6 is a diagram illustrating the positioning of the first back-line, the first hog-line, and the first tee-line on the curling sheet.

As can be seen in FIG. 6, the curling sheet is a rectangular area of ice, carefully prepared to be as flat and level as possible, 146 to 150 feet in length by 14.2 to 15.7 feet in width. The shorter borders of the curling sheet are called the backboards. Because of the elongated shape, several curling sheets may be laid out side by side in the same arena, allowing multiple games to be played simultaneously. A target, the house, is marked at each end of the curling sheet. The house consists of three concentric rings formed by painting or laying colored vinyl sheet under the ice and are usually distinguished by color. These rings are defined by their diameters as the four-foot, eight-foot and 12-foot rings. The rings are merely a visual aid for aiming and judging which stone is closer to the center; they do not affect scoring, but a curling stone must at least touch the outer ring, or it does not score. The center of each house, at the intersection of a center line and a tee line, is known as the button. A first hog-line and a second hog-line are drawn 21 feet from the center of the first tee line. The hacks are fixed behind each button; a hack gives the thrower something to push against when making the throw.

A key part of the preparation of the playing surface is the spraying of water droplets onto the ice, which form pebble on freezing. As the curling stone moves over the pebble, any rotation of the curling stone causes it to curl to the inside or outside. The amount of curl can change during a game as the pebble wears; the ice maker must monitor this and be prepared to scrape and re-pebble the surface prior to each game.

The preferred sensing module and the wireless-communication module are integrated into the handle of the curling stone. More specifically, the sensing module and the wireless-communication module are integrated into separate analog and digital circuits. In this embodiment, the sensing module mounted on the analog circuit side includes the IMU comprising a three-axis accelerometer, one dual-axis and one single-axis angular rate gyros, op-amps for signal integrity, magnetometer, compass and off-chip components for filtering. The digital circuit side includes the wireless-communication module comprising a microprocessor for data conversion, a low power UWB tracking transceiver, and a small surface mount antenna. Further, there are two small connectors that provide battery connection and the (one-time) connection to a host computer for downloading microprocessor firmware and uploading telemetry data.

The angular-motion measurement and the linear-motion measurement are obtained using the wireless Wifi and Bluetooth IMU and UWB tracking device that was developed for sports training and general human motion applications.

The minimized footprint is achieved using a 2-layer board containing four internal planes: two for interconnects and one each for power and ground. The assembled IMU board has a mass of 6.0 g and the associated miniature lithium-ion battery adds a mere 1.5 g. The power draw remains below 16 mW and the battery tank yields 36 h of uninterrupted use between recharging.

Figure 5:
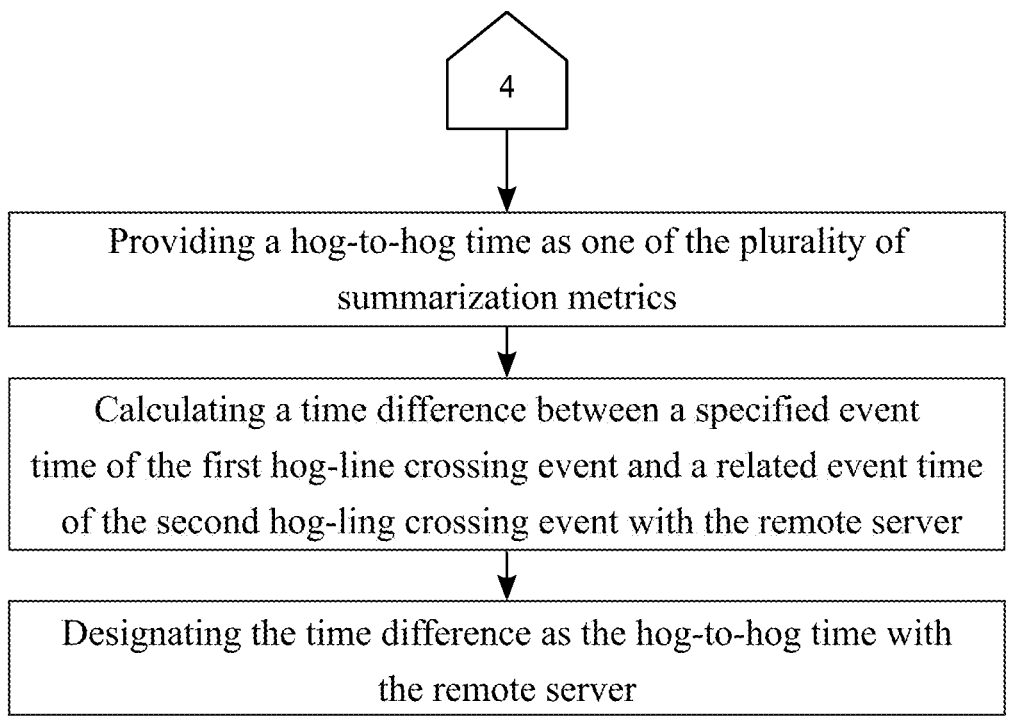
FIG. 5 is a flowchart of a subprocess for calculating a hog-to-hog time from the first hog-line crossing event and the second hog-line crossing event.

Referring to FIG. 5, the magnetometer is used to detect when the curling stone passes over the first hog-line magnetic strip or the second hog-line magnetic strip. This allows the player to measure a hog-to-hog time during the practice for the game. The hog-to-hog time is collected by measuring the time it takes for the curling stone to travel from the first hog-line to the second hog-line. This method can be used to time draws much like sheet timing. "Fast" ice takes 14-14½ seconds for the curling stone to traverse by this method. Using the hog-to-hog time, players can learn a variety of takeout weights during practice.

The hog-to-hog time is recorded as the elapsed time between the crossing of the first hog-line and the crossing of the second hog-line. Accordingly, a first hog-line crossing event is relayed to the remote server, if the first hog-line magnetic strip is detected by the magnetometer before step B. Similarly, a second hog-line crossing event is relayed to the remote server, if the second hog-line magnetic strip is detected by the magnetometer. In the preferred implementation, the sensing module acts as a data terminal which collects and transmits data to the remote server for further analysis and calculation. As such, the remote server calculates the elapsed time between the first hog-line crossing event and the second hog-line crossing event, or vice versa. Further, the first hog-line crossing event and the second hog-line crossing event are recorded as part of the sports telemetry. Accordingly, the remote server appends the first hog-line crossing event and/or the second hog-line crossing event into the sports telemetry data.

Preferably, the hog-to-hog time is provided as one of the plurality of summarization metrics. The specified event and the related event is designated when the player chooses to measure the hog-to-hog time. Depending on which direction the hog-to-hog time is recorded from, the special event and the related even may change. In one embodiment, the specified event is the first hog-line crossing event and the related event is the second hog-line crossing event. Accordingly, the remote server calculates a time difference between a specified event time of the first hog-line crossing event and a related event time of the second hog-line crossing event. As such, the remote server determines the elapsed time between the first hog-line crossing event and the second hog-line crossing event.

Figure 7:
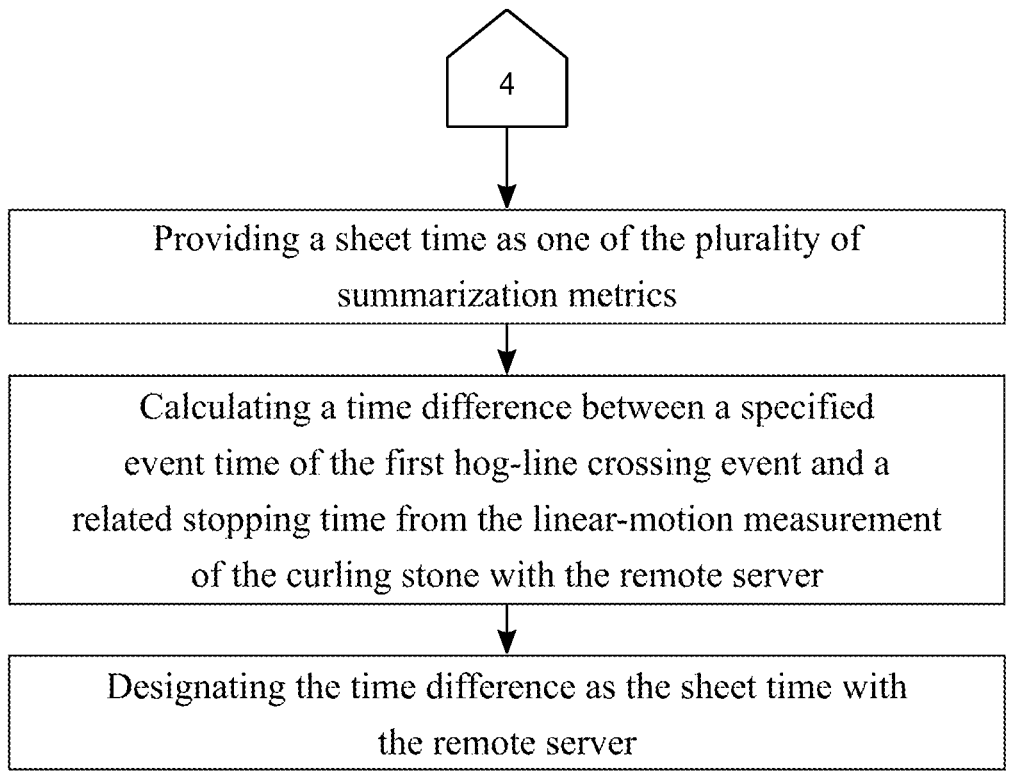
FIG. 7 is a flowchart of a subprocess for calculating a sheet time from the first hog-line crossing event and the related stopping time.

Referring to FIG. 7, the first hog-line magnetic strip and the second hog-line magnetic strip can also be used to measure a sheet time. The sheet time is collected by measuring the time it takes the curling stone to travel from the first hog-line at the release end to stop at the far end. The "faster" (slicker) the ice is the longer the sheet time. Accordingly, the remote server calculates a time difference between a specified event time of the first hog-line crossing event and a related stopping time from the linear-motion measurement of the curling stone. Further, the remote server designates the time difference as the sheet time with the remote server.

Figure 8:
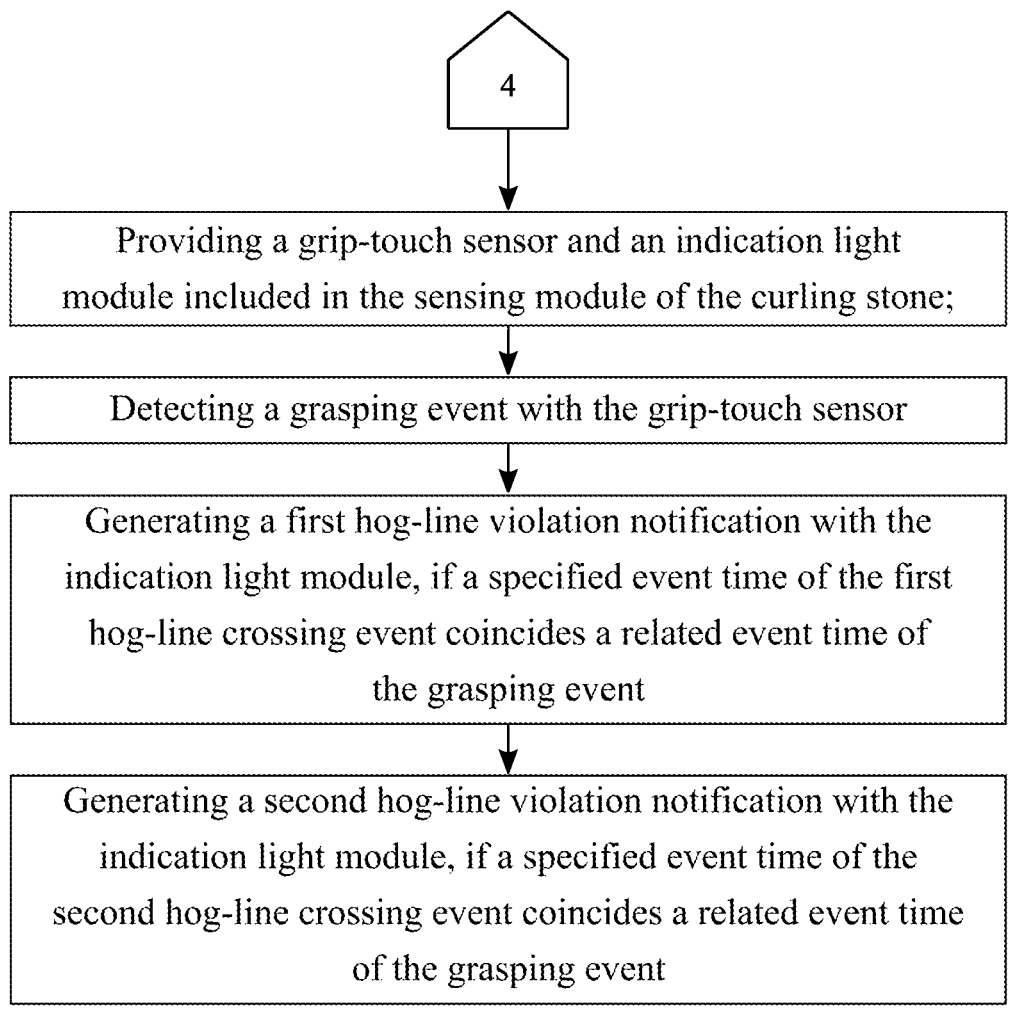
FIG. 8 is a flowchart of a subprocess for generating a first hog-line violation notification and a second hog-line violation notification with the touch sensor and the magnetometer.
Figure 9:
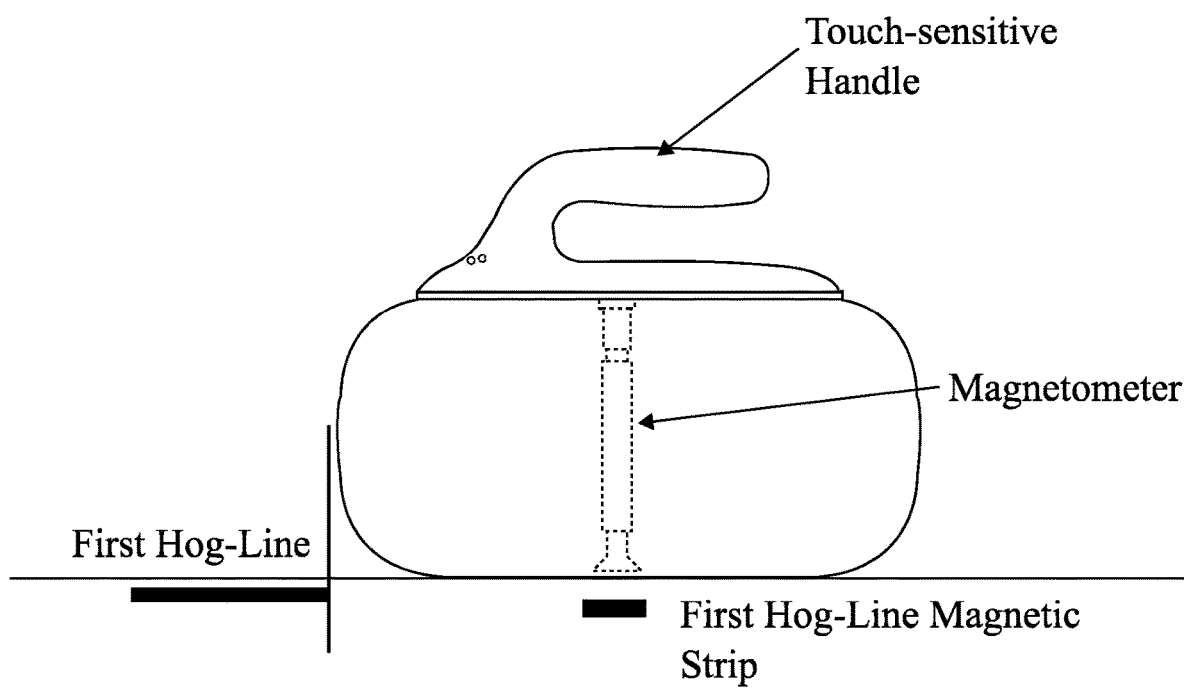
FIG. 9 is a schematic side view of the curling stone illustrating the position of the magnetometer in relation to the first hog-line magnetic strip.
Figure 10:
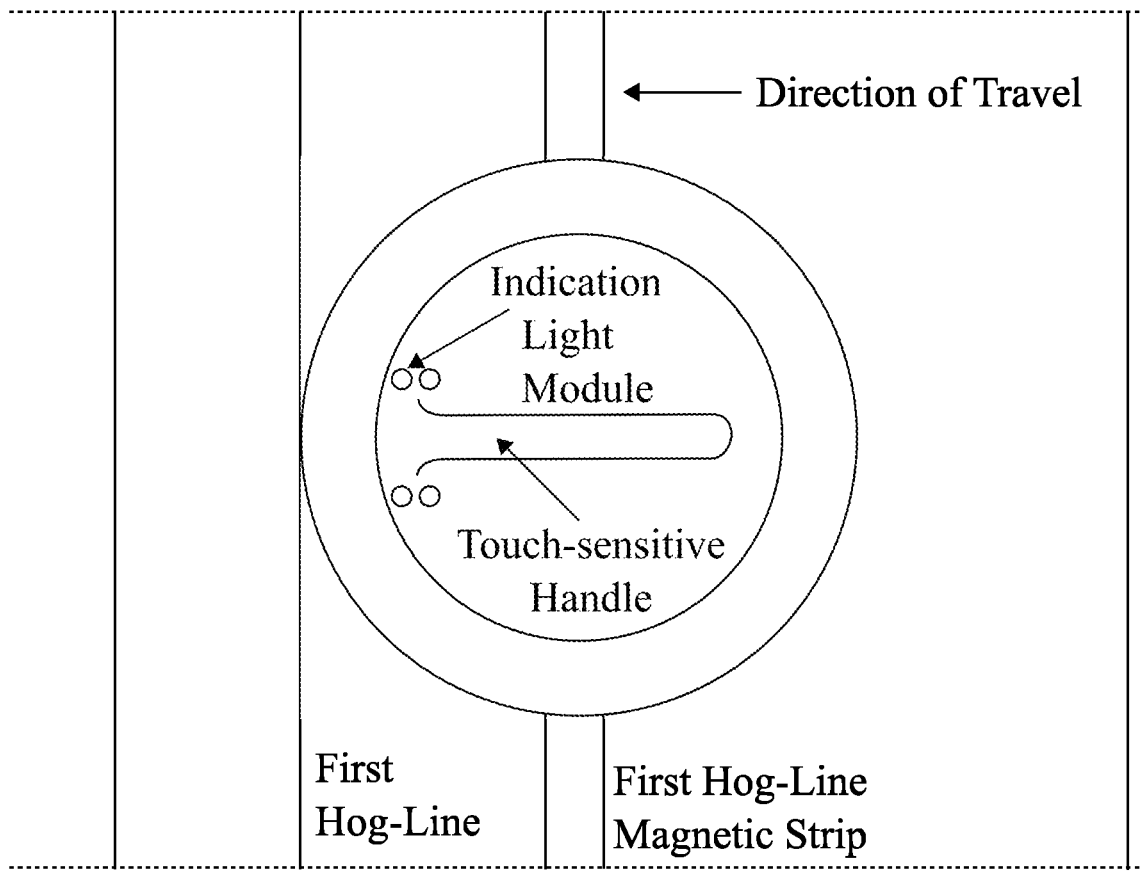
FIG. 10 is a schematic top view of the curling stone illustrating the positioning of the indication light module.

Referring to FIG. 8-FIG. 10, the first hog-line magnetic strip and/or second hog-line magnetic strip can be used to detect a hog-line violation. The hog-line violation feature provides impartial hog-line judging for the game. As such, a grip-touch sensor and an indication light included in the sensing module of the curling stone are provided. The preferred grip-touch sensor uses a conductive paint coated on the curling handle. As such, the grip-touch sensor detects a grasping event. When the grip-touch sensor is not activated, the indication light module flashes green lights. Operation of the grip-touch sensor is confirmed when the indication lights module stops flashing the green lights. The hog-line violation is generated if the player fails to release the handle before the curling stone passes the first hog-line magnetic strip. As such, the indication light module generates a first hog-line violation notification, if a specified event time of the first hog-line crossing event coincides a related event time of the grasping event. Similarly, if the opposite end of the curling sheet is used, the indication light module generates a second hog-line violation notification, if a specified event time of the second hog-line crossing event coincides a related event time of the grasping event.

As previously mentioned, the first hog-line crossing event or the second hog-line crossing event are detected by the magnetometer included in the sensing unit. In the preferred embodiment, the indication light module resumes flashing green lights after a valid release. Alternately, if the hog-line violation has occurred, the indication light module flashes red lights. Preferably, the indication light module turns off when not in use to extend the battery life to over a full curling session.

Figure 11:
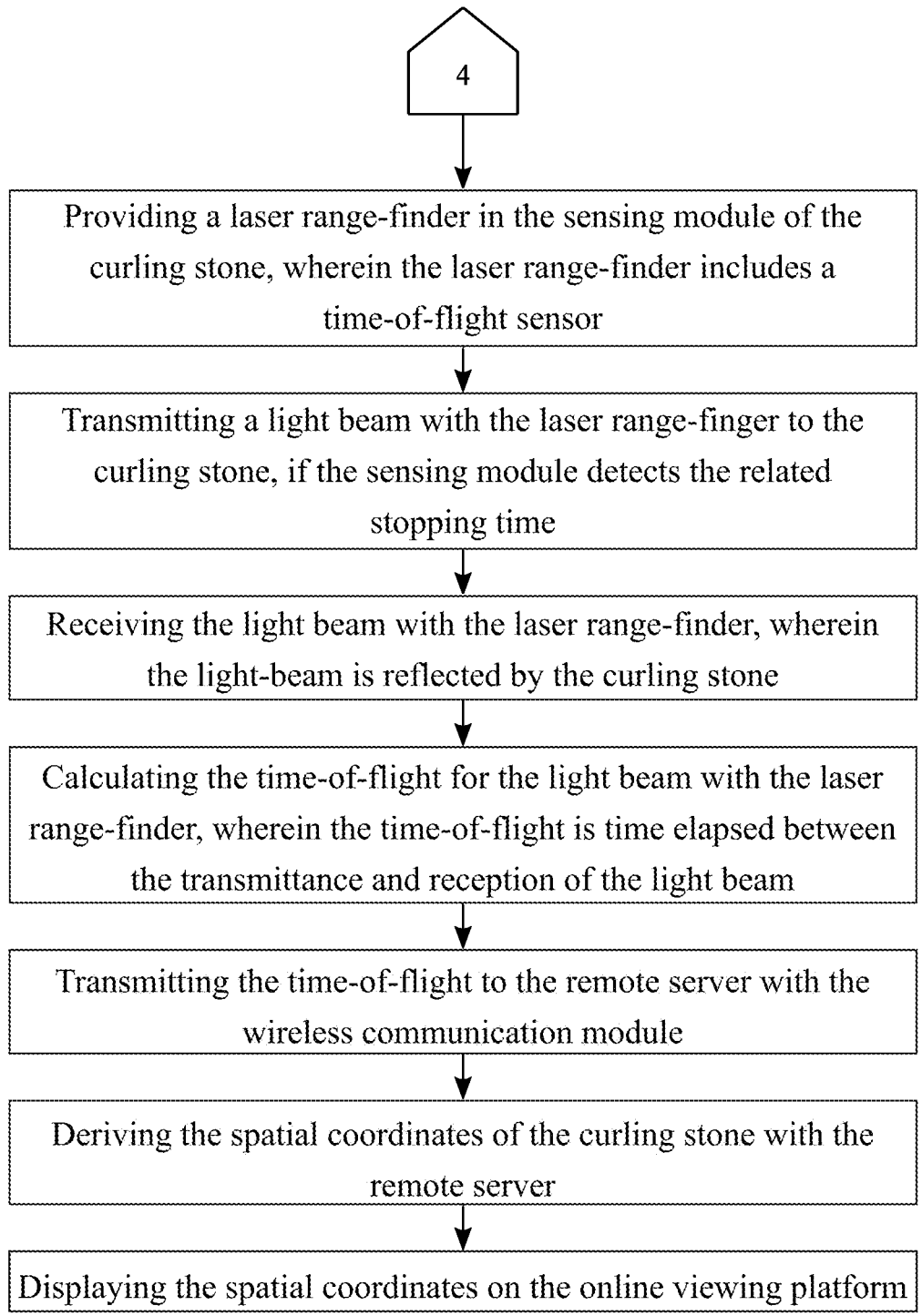
FIG. 11 is a flowchart of a subprocess for deriving the spatial coordinates of the curling stone with the laser rangefinder.

Referring to FIG. 11, once the curling stone has settled on the curling sheet, the present invention provides a method of measuring precise distance from the house center. As such, a laser range finder is provided in the sensing module of the curling stone, wherein the laser range-finder includes a time-of-flight sensor. The laser range-finder uses a combination of precision laser measurement, LIDAR, and time-of-flight sensor. Unlike the traditional laser measuring tool, the laser range-finder contains a very tiny invisible laser source, and the matching time-of-flight sensor. The time-of-flight sensor can detect the "time of flight", or how long the light beam has taken to bounce back to the time-of-flight sensor. As such, the laser range-finder transmits a light beam to the curling stone, if the sensing module detects the related stopping time. More specifically, the LIDAR transmits a very narrow light beam, which is good for determining distance of any object directly in front of the laser range-finder. Accordingly, the laser range-finder receives the light beam, wherein the light-beam is reflected by the curling stone. Unlike sonars that bounce ultrasonic waves, the light beam has a very narrow 'cone' of sensing. Unlike IR distance sensors that try to measure the amount of light bounced, the STMT is much more precise and doesn't have linearity problems or 'double imaging' where you can't tell if an object is very far or very close.

Subsequently, the laser range-finder calculates the time-of-flight for the light beam, wherein the time-of-flight is the time elapsed between the transmittance and reception of the light beam. In the preferred embodiment, the wireless communication module transmits the time-of-flight to the remote server. Alternately, the time-of-flight may be stored in a memory module of the laser range-finder. Finally, the remote server derives the spatial coordinates of the curling stone. Preferably, the online viewing platform displays the spatial coordinates.

Figure 12:
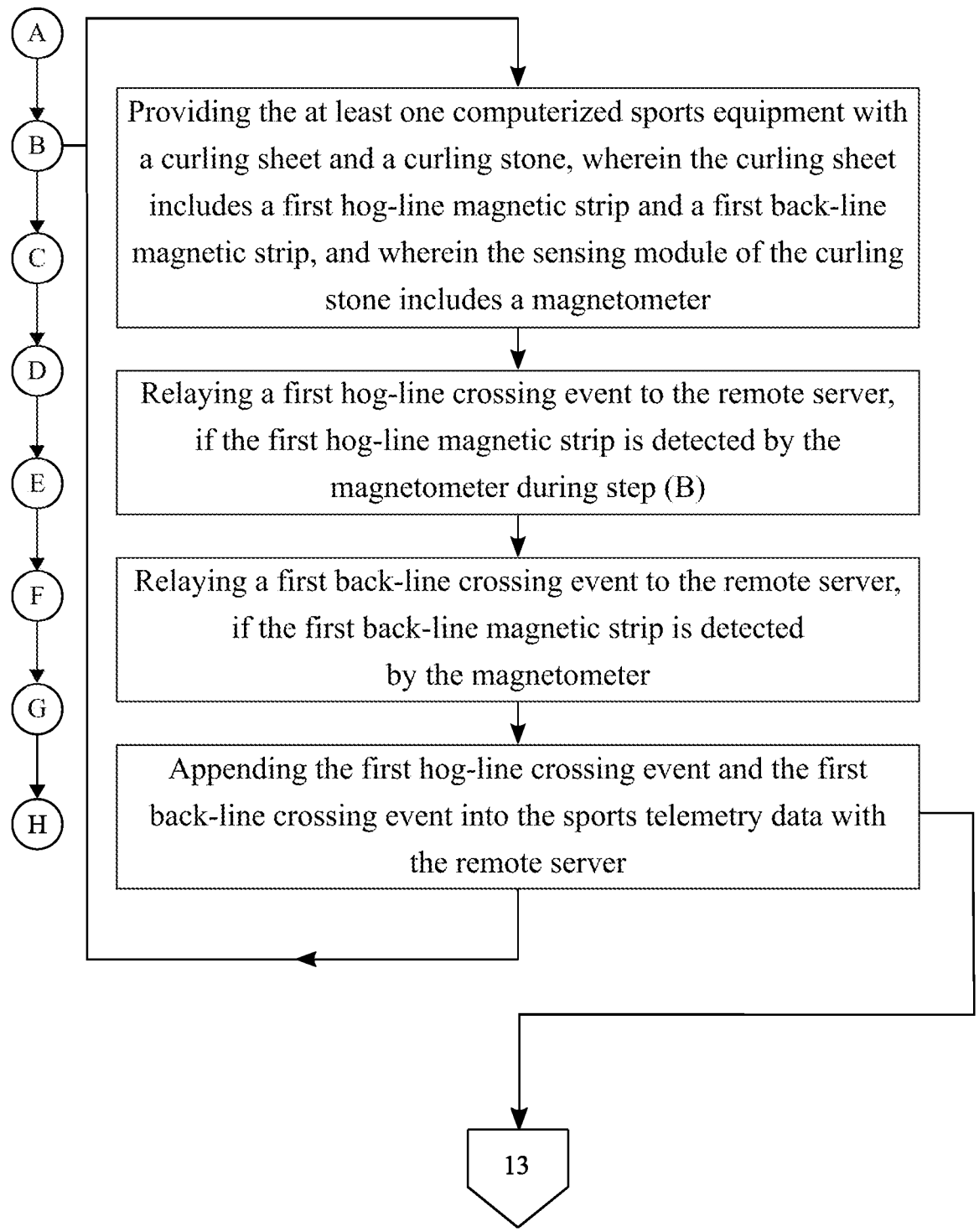
FIG. 12 is a flowchart of a subprocess for detecting the first hog-line magnetic strip and the first back-line magnetic strip.

FIG. 12 illustrates another possible embodiment wherein the sensing module measures a split time. The split time helps the players judge the weight of the curling stone. This is achieved by timing a shot between two points, usually the first back-line or the first tee-line and the first hog-line. The split time is the time it takes the curling stone to travel from back-line (or tee line) to the hog line and indicates its ability to make it to a relative location at the opposite end of the sheet. As such, the curling sheet is provided with a first back-line magnetic strip. As mentioned, the split time may be measured from the first back-line to the first hog-line. As such, a first hog-line crossing event is relayed to the remote server, if the first hog-line magnetic strip is detected by the magnetometer before step B. Further, a first back-line crossing event is relayed to the remote server, if the first back-line magnetic strip is detected by the magnetometer. Preferably, the first hog-line crossing event and the first back-line crossing event are appended into the sports telemetry data with the remote server.

Figure 13:
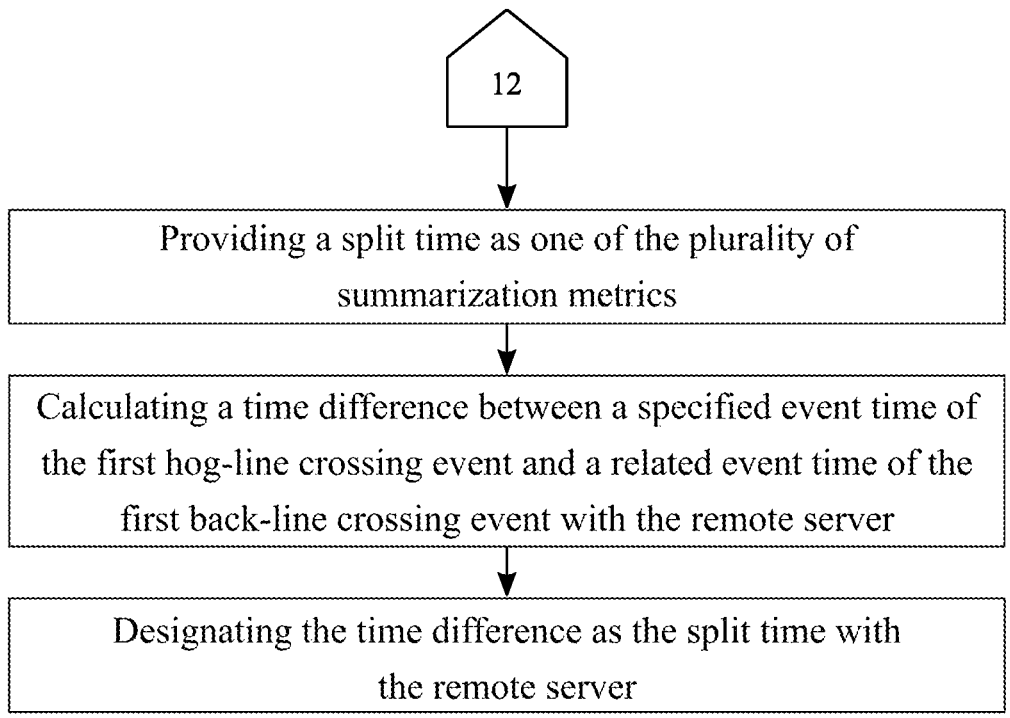
FIG. 13 is a flowchart of a subprocess for calculating a split time from the first hog-line crossing event and the first back-line crossing event.

Referring to FIG. 13, preferably, the split time is provided as one of the plurality of summarization metrics. In one possible embodiment, the split time is measured from the first back-line to the first hog-line. As such, the remote server calculates a time difference between a specified event time of the first back-line crossing event and a related event time of the first hog-line crossing event. Further, the remote server designates the time difference as the split time.

Figure 14:
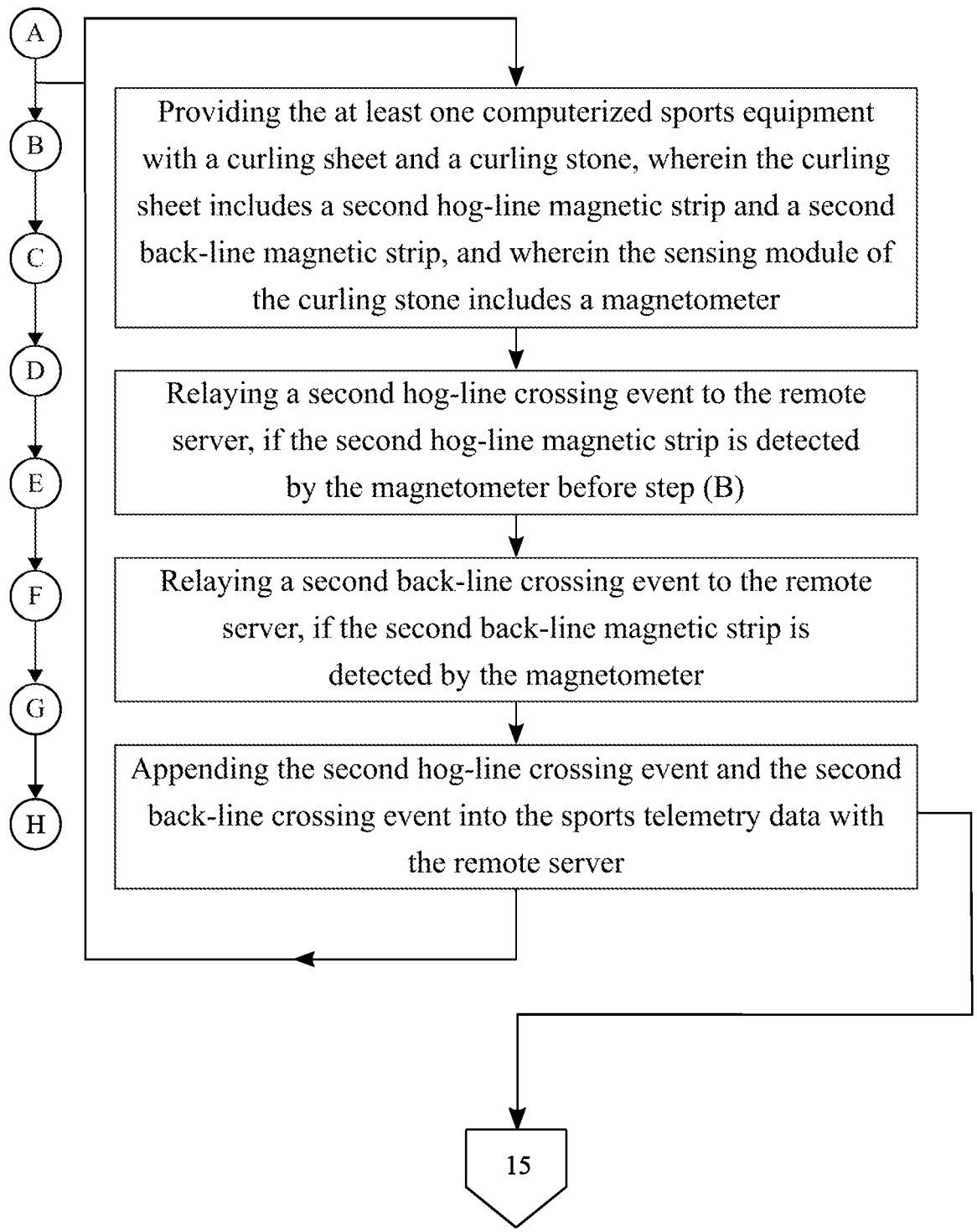
FIG. 14 is a flowchart of a subprocess for detecting the second hog-line magnetic strip and the second back-line magnetic strip.

Referring to FIG. 14, in an alternate embodiment, the split-time is taken from the reverse side of the curling sheet. As such, the curling sheet is provided with a second back-line magnetic strip and a second hog-line magnetic strip. Accordingly, a second hog-line crossing event is relayed to the remote server, if the second hog-line magnetic strip is detected by the magnetometer before step B. Further, a second back-line crossing event is relayed to the remote server, if the second back-line magnetic strip is detected by the magnetometer. Preferably, the second hog-line crossing event and the second back-line crossing event are appended into the sports telemetry data with the remote server.

Figure 15:
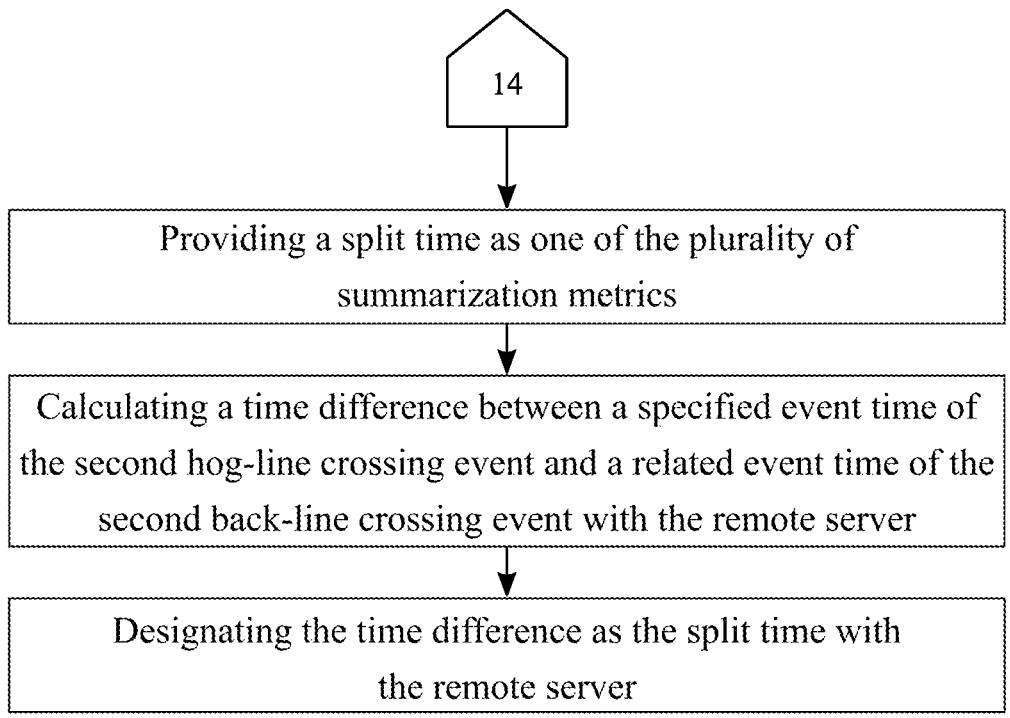
FIG. 15 is a flowchart of a subprocess for calculating a split time from the second hog-line crossing event and the second back-line crossing event.

Referring to FIG. 15, accordingly, the remote server calculates a time difference between a specified event time of the second back-line crossing event and a related event time of the second hog-line crossing event. Further, the remote server designates the time difference as the split time.

In another possible embodiment, in addition to the hog-to-hog time, the split time, the sheet time, hog-line violation, and the thinking time, the sensing module also collects takeout impact force, push/pull acceleration, and a curling line of path as the sports telemetry data. The push/pull acceleration is derived from the instantaneous acceleration of the curling stone when hit by another curling stone, as measured by the IMU. Alternately, the remote server calculates the curling line of path based on the data collected by the IMU and the tracking module. Further, the curling line of path may be overlaid into the equipment motion animation to give players a clear view of the path of the curling stone.

Figure 16:
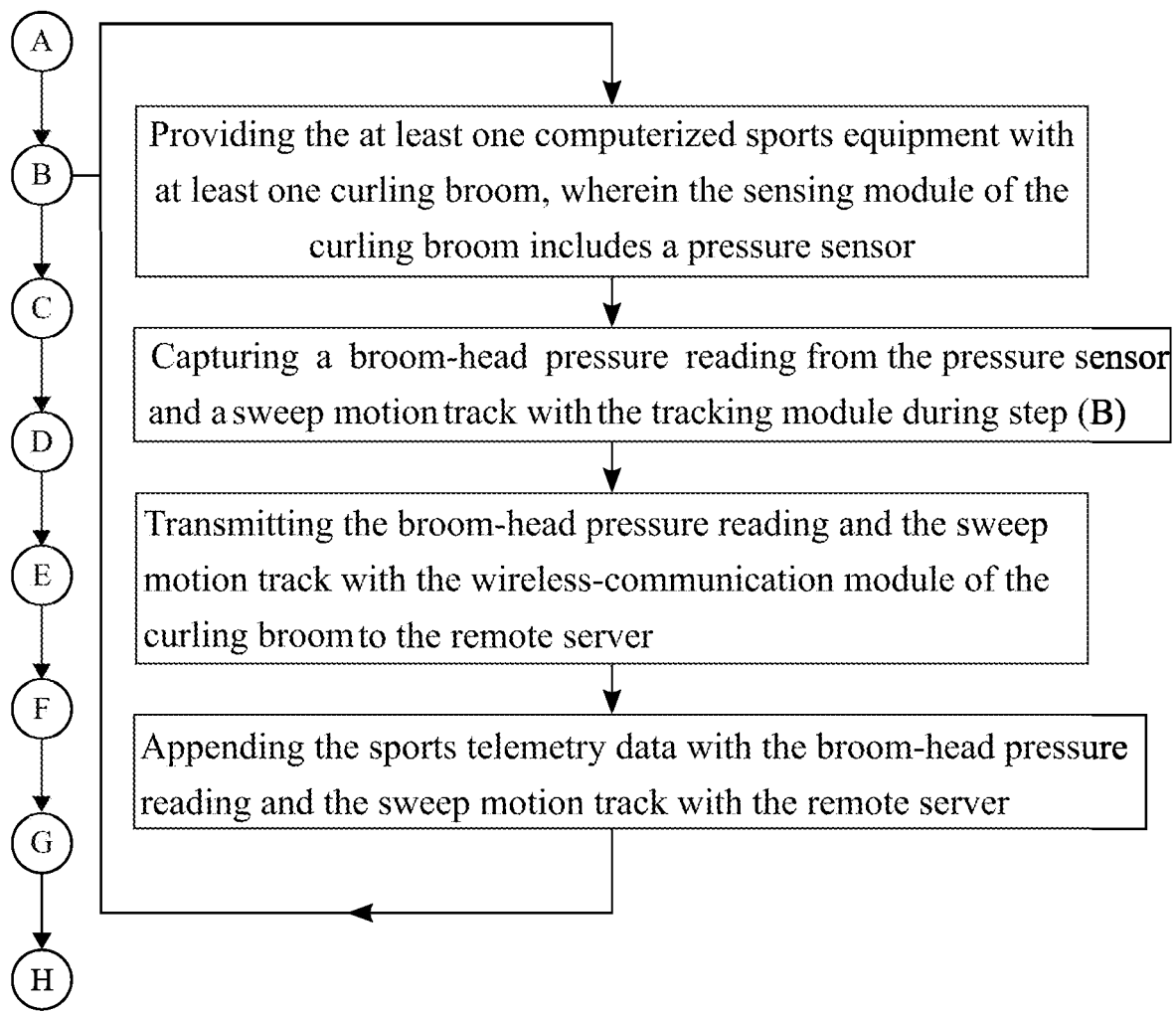
FIG. 16 is a flowchart of a subprocess for capturing and transmitting a broom-head pressure reading from the curling broom to the remote server.

Referring to FIG. 16, as mentioned, the preferred embodiment of the present invention comprises the plurality of curling brooms. As such, the at least one computerized sports equipment is provided with at least one curling broom, wherein the sensing module of the curling broom includes a pressure sensor. The pressure sensor captures a broom-head pressure reading from the pressure sensor and a sweep motion track with the tracking module during step B. This allows the curling broom to measure the pressure, stroke, angle, and motion of the sweep and its effect on the path of the curling stone as it proceeds down the curling sheet. Subsequently, the broom-head pressure reading and the sweep motion track is transmitted with the wireless-communication module of the curling broom to the remote server. Preferably, the remote server appends the sports telemetry data with the broom-head pressure reading and the sweep motion track. The broom-head pressure reading is used to determine the effect of the curling broom on the pebble droplets on the curling sheet. More specifically, the pressure with which the curling broom sweeps creates friction which melts the pebbles. Accordingly, this makes the curling sheet more slippery thereby allowing the curling stone to glide farther and straighter down the curling sheet. Additional insights into the dynamics of the curling stone may be gathered from the broom-head pressure reading.

Figure 17:
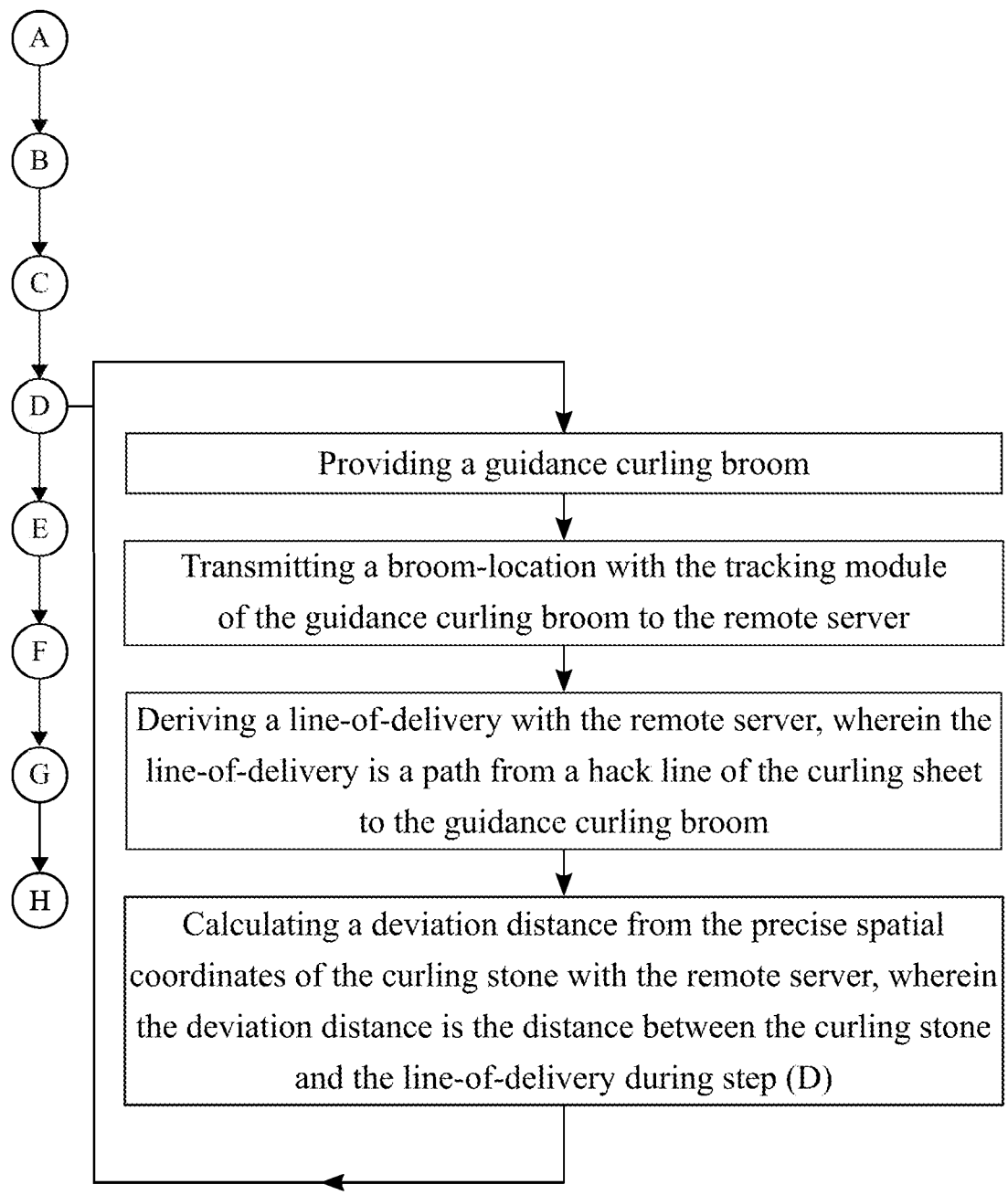
FIG. 17 is a flowchart of a subprocess for deriving a line-of-delivery from the hack-line to the guidance curling broom with the remote server.

Referring to FIG. 17, in another embodiment, a guidance curling broom enables the setup of a line-of-delivery. The line-of-delivery is an imaginary line between the hack line, the player, or the curling stone to the guidance curling broom. Over the course of a game, the player must remain properly aligned to the guidance curling broom and ensure that the curling stone is consistently on the line-of-delivery with the correct weight, and with the correct and appropriate rotation applied to the curling stone. To date, there has been no quantitative assessment of the ability of players to deliver the curling stone on the line-of-delivery, whether it is positioned to the right, center, or left of the house, with an in-turn (clock) or out-turn (counter clock) rotation or delivered at a draw or a take-out speed. Accordingly, the remote server uses the sensing module of the curling stone and the guidance curling broom to determine whether the curling stone follows the line-of-delivery. As such, the tracking module of the guidance curling broom transmits a broom-location to the remote server. Subsequently, the remote server derives the line-of-delivery, wherein the line-of-delivery is the path from the hack line of the curling sheet to the guidance curling broom. Finally, the remote server calculates a deviation distance from the precise spatial coordinates of the curling stone, wherein the deviation distance is the distance between the curling stone and the line-of-delivery during step D. Accordingly, the deviation distance is used to assess the ability of the players to deliver the curling stone to the desired line-of-delivery with great accuracy and consistency.

Although the invention has been explained in relation to its preferred embodiment, it is to be understood that many other possible modifications and variations can be made without departing from the spirit and scope of the invention as hereinafter claimed.

What is claimed is:

1. A method for delivering sports telemetry for a curling game, the method comprises the steps of:
   (A) providing at least one computerized sports equipment and at least one remote server, wherein a sensing device, a tracking device, and a wireless-communication device is electronically integrated into the computerized sports equipment, and wherein the remote server hosts an online viewing platform;
   (B) capturing an angular-motion measurement and a linear-motion measurement with the sensing device;
   (C) sending the angular-motion measurement and the linear-motion measurement from the wireless-communication device to the remote server;
   (D) sending a precise location reading of the sports equipment from the tracking device to the remote server;
   (E) periodically executing a plurality of iteration for steps (B) through (D) in order to compile the angular-motion measurement and the linear-motion measurement from each iteration into a sports telemetry data;
   (F) assessing a plurality of summarization metrics from the sports telemetry data with the remote server;
   (G) generating at least one equipment motion animation from the sport telemetry data with the remote server; and
   (H) displaying the summarization metric and the equipment motion animation through the online view platform.

2. The method for delivering sports telemetry for a curling game, the method as claimed in claim 1, wherein the sensing device is a wireless micro-electro-mechanical systems (MEMS) inertial measurement unit (IMU).

3. The method for delivering sports telemetry for a curling game, the method as claimed in claim 1, wherein the tracking device is an ultra-wideband tracking transceiver.

4. The method for delivering sports telemetry for a curling game, the method as claimed in claim 1 comprises the steps of:
   providing a communication anchor, wherein the communication anchor is proximally located to the sports equipment; and
   relaying the precise location reading from the tracking device, through the communication anchor, and to the remote server during step (C).

5. The method for delivering sports telemetry for a curling game, the method as claimed in claim 1 comprises the steps of:
   providing the at least one computerized sports equipment with at least one curling sheet and at least one curling stone, wherein the sensing device of the curling sheet includes a first hog-line magnetic strip and a second hog-line magnetic strip, and wherein the sensing device of the curling stone includes a magnetometer;

relaying a first hog-line crossing event to the remote server, if the first hog-line magnetic strip is detected by the magnetometer before step (B);

relaying a second hog-line crossing event to the remote server, if the second hog-line magnetic strip is detected by the magnetometer; and appending the first hog-line crossing event and/or the second hog-line crossing event into the sports telemetry data with the remote server.

6. The method for delivering sports telemetry for a curling game, the method as claimed in claim 5 comprises the steps of:

providing a hog-to-hog time as one of the plurality of summarization metrics;

calculating a time difference between a specified event time of the first hog-line crossing event and a related event time of the second hog-ling crossing event with the remote server; and designating the time difference as the hog-to-hog time with the remote server.

7. The method for delivering sports telemetry for a curling game, the method as claimed in claim 5 comprises the steps of:

providing a sheet time as one of the plurality of summarization metrics;

calculating a time difference between a specified event time of the first hog-line crossing event and a related stopping time from the linear-motion measurement of the curling stone with the remote server; and designating the time difference as the sheet time with the remote server.

8. The method for delivering sports telemetry for a curling game, the method as claimed in claim 5 comprises the steps of:

providing a grip-touch sensor and an indication light device included in the sensing device of the curling stone;

detecting a grasping event with the grip-touch sensor;

generating a first hog-line violation notification with the indication light device, if a specified event time of the first hog-line crossing event coincides a related event time of the grasping event; and generating a second hog-line violation notification with the indication light device, if a specified event time of the second hog-line crossing event coincides a related event time of the grasping event.

9. The method for delivering sports telemetry for a curling game, the method as claimed in claim 5 comprises the steps of:

providing a laser range-finder in the sensing device of the curling stone, wherein the laser range-finder includes a time-of-flight sensor;

transmitting a light beam with the laser range-finger to the curling stone, if the sensing device detects the related stopping time;

receiving the light beam with the laser range-finder, wherein the light-beam is reflected by the curling stone;

calculating the time-of-flight for the light beam with the laser range-finder, wherein the time-of-flight is time elapsed between the transmittance and reception of the light beam;

transmitting the time-of-flight to the remote server with the wireless communication device;

deriving the spatial coordinates of the curling stone with the remote server; and displaying the spatial coordinates on the online viewing platform.

10. The method for delivering sports telemetry for a curling game, the method as claimed in claim 1 comprises the steps of:

providing the at least one computerized sports equipment with a curling sheet and a curling stone, wherein the curling sheet includes a first hog-line magnetic strip and a first back-line magnetic strip, and wherein the sensing device of the curling stone includes a magnetometer;

relaying a first hog-line crossing event to the remote server, if the first hog-line magnetic strip is detected by the magnetometer before step (B);

relaying a first back-line crossing event to the remote server, if the first back-line magnetic strip is detected by the magnetometer; and appending the first hog-line crossing event and the first back-line crossing event into the sports telemetry data with the remote server.

11. The method for delivering sports telemetry for a curling game, the method as claimed in claim 10 comprises the steps of:

providing a split time as one of the plurality of summarization metrics;

calculating a time difference between a specified event time of the first hog-line crossing event and a related event time of the first back-line crossing event with the remote server; and designating the time difference as the split time with the remote server.

12. The method for delivering sports telemetry for a curling game, the method as claimed in claim 1 comprises the steps of:

providing the at least one computerized sports equipment with a curling sheet and a curling stone, wherein the sensing device of the curling sheet includes a second hog-line magnetic strip and a second back-line magnetic strip, and wherein the sensing device of the curling stone includes a magnetometer;

relaying a second hog-line crossing event to the remote server, if the second hog-line magnetic strip is detected by the magnetometer before step (B);

relaying a second back-line crossing event to the remote server, if the second back-line magnetic strip is detected by the magnetometer; and appending the second hog-line crossing event and the second back-line crossing event into the sports telemetry data with the remote server.

13. The method for delivering sports telemetry for a curling game, the method as claimed in claim 12 comprises the steps of:

providing a split time as one of the plurality of summarization metrics;

calculating a time difference between a specified event time of the second hog-line crossing event and a related event time of the second back-line crossing event with the remote server; and designating the time difference as the split time with the remote server.

14. The method for delivering sports telemetry for a curling game, the method as claimed in claim 1 comprises the steps of:

providing the at least one computerized sports equipment with at least one curling broom, wherein the sensing device of the curling broom includes a pressure sensor;

capturing a broom-head pressure reading from the pressure sensor and a sweep motion track with the tracking device during step (B);

transmitting the broom-head pressure reading and the sweep motion track with the wireless-communication device of the curling broom to the remote server; and appending the sports telemetry data and the sweep motion track with the broom-head pressure reading with the remote server.

15. The method for delivering sports telemetry for a curling game, the method as claimed in claim 1 comprises the steps of:

providing a guidance curling broom;

transmitting a broom-location with the tracking device of the guidance curling broom to the remote server;

deriving a line-of-delivery with the remote server, wherein the line-of-delivery is the path from a hack line of the curling sheet to the guidance curling broom; and calculating a deviation distance from the precise spatial coordinates of the curling stone with the remote server, wherein the deviation distance is the distance between the curling stone and the line-of-delivery during step (D).

* * * * *